United States Patent [19]
Ham et al.

[11] Patent Number: 5,953,957
[45] Date of Patent: Sep. 21, 1999

[54] VEHICLE WINDOW DRIVE SYSTEM AND METHOD

[75] Inventors: Craig A. Ham, Miamisburg; William R. Mack, Kettering; Ralph J. Unterborn, Dayton; Jeffrey T. Weller, Dayton; Peter S. Zhou, Dayton, all of Ohio

[73] Assignee: Valeo, Inc., Auburn Hills, Mich.

[21] Appl. No.: 08/997,125

[22] Filed: Dec. 23, 1997

Related U.S. Application Data

[62] Division of application No. 08/620,853, Mar. 18, 1996, Pat. No. 5,829,305.

[51] Int. Cl.$^6$ ............................... F16H 1/16; E05F 11/38
[52] U.S. Cl. .............................................. 74/89.14; 74/425
[58] Field of Search ................................. 74/89.14, 425, 74/458; 49/341

[56] References Cited

U.S. PATENT DOCUMENTS

| | | | |
|---|---|---|---|
| Re. 34,667 | 7/1994 | Neumann | 310/216 |
| 1,320,372 | 11/1919 | Brock | 74/458 |
| 1,683,163 | 9/1928 | Cone . | |
| 1,694,028 | 12/1928 | Wildhaber . | |
| 1,797,461 | 3/1931 | Wildhaber . | |
| 1,876,795 | 9/1932 | Trbojevich . | |
| 1,948,795 | 2/1934 | Merritt | 74/41 |
| 1,966,358 | 7/1934 | Robak | 74/458 |
| 1,973,185 | 9/1934 | Trbojevich | 74/41 |
| 2,338,367 | 1/1944 | Trobojevich | 74/458 |
| 2,885,903 | 5/1959 | Parz | 74/458 |
| 2,975,649 | 3/1961 | Propst | 74/424 |
| 3,045,557 | 7/1962 | Yamamoto et al. | 74/458 |
| 3,068,713 | 12/1962 | Davis | 74/424 |
| 3,068,714 | 12/1962 | Davis | 74/459 |
| 3,302,477 | 2/1967 | Grabowski | 74/424 |
| 3,333,484 | 8/1967 | Young | 74/424 |
| 3,386,305 | 6/1968 | Wildhaber | 74/424 |
| 3,476,966 | 11/1969 | Willyoung . | |
| 3,477,125 | 11/1969 | Schwartz | 29/596 |
| 3,489,938 | 1/1970 | Nakamura | 310/214 |
| 3,728,907 | 4/1973 | Stade | 74/458 |
| 3,855,486 | 12/1974 | Binder et al. | 310/49 |
| 3,869,629 | 3/1975 | Ogawa et al. | 310/216 |
| 3,894,256 | 7/1975 | Sholtz | 310/90 |
| 3,937,097 | 2/1976 | Fund et al. | 74/424 |
| 4,025,840 | 5/1977 | Brissey et al. | 322/52 |
| 4,031,610 | 6/1977 | Singh et al. | 29/598 |
| 4,037,485 | 7/1977 | Mihalko | 310/208 |
| 4,047,449 | 9/1977 | Popov | 74/458 |
| 4,258,584 | 3/1981 | Haegele et al. | 74/424 |
| 4,400,639 | 8/1983 | Kobayashi et al. | 310/215 |
| 4,591,766 | 5/1986 | Takaba | 318/254 |

(List continued on next page.)

FOREIGN PATENT DOCUMENTS

| | | |
|---|---|---|
| 3204530 | 8/1983 | Germany . |
| 4218639 | 9/1993 | Germany . |
| 5814455 | 8/1983 | Japan . |
| 6399741 | 5/1988 | Japan . |

OTHER PUBLICATIONS

"Powermax II Hybrid Step Motors" by Pacific Scientific, Motor Control Division, 4301 Kishwaukee Street, P.O. Box 106, Rockford, Illinois 61105-0106, Jul. 1995.

*Primary Examiner*—Allan D. Herrmann
*Attorney, Agent, or Firm*—J. Gordon Lewis

[57] ABSTRACT

This invention deals with a system and method for manufacturing a drive gear having a plurality of teeth in cross section where the teeth are situated on a drive shaft in a substantially parallel manner. The drive gear is characterized in that the teeth are substantially parallel to each other and contact mating driven teeth at points which define an arc which is not concentric about an axis of the driven gear. The drive gear is characterized in that it has multi-tooth contact points which do not contact the teeth of the mating gear at exactly the same contact point on the mating teeth, thereby lengthening the life of the driven gear as well as distributing the torque load to a plurality of teeth. A method and procedure for generating a drive gear having the features of the present invention is also disclosed.

2 Claims, 6 Drawing Sheets

U.S. PATENT DOCUMENTS

| | | | |
|---|---|---|---|
| 4,665,765 | 5/1987 | Heine | 74/458 |
| 4,739,671 | 4/1988 | Nelson | 74/458 |
| 4,745,320 | 5/1988 | Oyama et al. | 310/217 |
| 4,780,632 | 10/1988 | Murray, III | 310/217 |
| 4,780,635 | 10/1988 | Neumann | 310/216 |
| 4,801,832 | 1/1989 | Neumann | 310/216 |
| 4,818,905 | 4/1989 | Lender | 310/42 |
| 4,823,032 | 4/1989 | Ward et al. | 310/43 |
| 4,839,552 | 6/1989 | Takaba | 310/268 |
| 4,862,026 | 8/1989 | Riback | 310/90 |
| 4,868,436 | 9/1989 | Attilio et al. | 310/67 |
| 4,887,480 | 12/1989 | Pollo | 74/459 |
| 4,972,113 | 11/1990 | Newberg | 310/217 |
| 5,006,747 | 4/1991 | Stewart, Sr. | 310/239 |
| 5,008,572 | 4/1991 | Marshall et al. | 310/45 |
| 5,010,266 | 4/1991 | Uchida | 310/156 |
| 5,012,691 | 5/1991 | Bertot | 74/434 |
| 5,040,430 | 8/1991 | Adam et al. | 74/425 |
| 5,049,771 | 9/1991 | Challita et al. | 310/219 |
| 5,068,556 | 11/1991 | Lykes et al. | 310/90 |
| 5,068,557 | 11/1991 | Murugan | 310/90 |
| 5,073,735 | 12/1991 | Takagi | 310/71 |
| 5,086,245 | 2/1992 | Sieja et al. | 310/216 |
| 5,087,847 | 2/1992 | Giesbert et al. | 310/90 |
| 5,088,362 | 2/1992 | Schalles | 82/142 |
| 5,113,114 | 5/1992 | Shih et al. | 310/270 |
| 5,128,571 | 7/1992 | Itsu | 310/67 |
| 5,173,629 | 12/1992 | Peters | 310/216 |
| 5,173,651 | 12/1992 | Buckley et al. | 318/701 |
| 5,222,402 | 6/1993 | White et al. | 74/89.15 X |
| 5,296,773 | 3/1994 | El-Antably et al. | 310/261 |
| 5,306,976 | 4/1994 | Beckman | 310/215 |
| 5,313,131 | 5/1994 | Hibino et al. | 310/254 |
| 5,321,328 | 6/1994 | Ide | 310/90 |
| 5,349,741 | 9/1994 | Neuenschwander | 29/598 |
| 5,357,160 | 10/1994 | Kaneda et al. | 310/67 |
| 5,382,860 | 1/1995 | Fanning et al. | 310/216 |
| 5,392,666 | 2/1995 | Lin | 74/427 |
| 5,394,043 | 2/1995 | Hsia | 310/90 |
| 5,410,921 | 5/1995 | Deynet et al. | 74/425 |
| 5,438,888 | 8/1995 | Dickhoff | 74/459 |

VEHICLE WINDOW DRIVE SYSTEM AND METHOD

RELATED APPLICATION

This application is a division of application Ser. No. 08/620,853 filed Mar. 18, 1996, now U.S. Pat. No. 5,829,305 issued Nov. 3, 1998.

BACKGROUND OF THE INVENTION

1. Field of the Invention

This invention relates to vehicle window drive system and method and, more particularly, to a multi-tooth contact drive gear system and method used in a vehicle window environment which may be manufactured using roll manufacturing techniques.

2. Description of Related Art

In window drive systems of the past, it was not uncommon to use a worm gear which was rotatably driven by a drive motor and which, in turn, drove a driven gear. Typically, the worm gear comprised a torque capacity which was much less than, for example, an enveloped gear. This was due primarily to the fact that the worm gear had a primary or single contact tooth which contacted a mating tooth of the driven gear.

Unfortunately, to achieve multi-tooth contact and increased torque capacity and other advantages of an enveloped gear, the teeth of the enveloped gear had to be specially machined and could not typically be mass-produced using conventional roll manufacturing techniques.

In the past, attempts have been made to use conventional roll manufacturing techniques to generate a multi-contact worm gear; however, such designs were deficient because the contact points (where the gear teeth of the drive gear contacted mating teeth of the driven gear) were situated on an arc which was concentric about the axis of the driven gear. This had the disadvantage of causing the multiple teeth to contact the driven teeth at a single contact location on the driven gear. This, in turn, increased the wear at that contact point, thereby reducing the useful life of the driven gear.

What is needed, therefore, is a system and method for providing a drive gear which will have improved torque capacity and which can be manufactured on a mass production basis using roll manufacturing techniques.

SUMMARY OF THE INVENTION

A primary object of this invention is to provide a system and method for manufacturing a multi-contact drive gear having improved torque capacity and also comprising a design which enables the gear to be manufactured using roll manufacturing techniques.

In one aspect, this invention comprises a drive gear comprising a drive shaft, a plurality of teeth in cross-section situated on said drive shaft, the plurality of teeth being substantially parallel to each other; and at least two of said plurality of teeth contacting any one of a plurality of driven teeth on a driven gear such that wear is distributed across a face of one of the plurality of driven teeth.

In another aspect, this invention comprises a method for increasing drive torque of a roll-manufactured drive gear, comprising the steps of determining a driven gear layout, generating a drive gear layout using the driven gear layout, rolling a plurality of drive teeth on a drive shaft using the drive gear layout, the plurality of drive teeth being substantially parallel to each other, situating the plurality of drive teeth in operative relationship with a plurality of driven teeth on a driven gear such that a plurality of drive teeth engage a plurality of driven teeth at different contact points.

In still another aspect, this invention comprises a component drive motor comprising a motor for driving a worm gear, the worm gear comprising a plurality of worm teeth in cross section which are substantially parallel to one another, a driven gear comprising a plurality of driven teeth, the plurality of drive teeth contacting the plurality of driven teeth at a plurality of contact points such that wear is distributed across a face of each of the plurality of driven teeth; and a linkage coupler for coupling the driven gear to a component such that when the motor is energized said component is driven in a predetermined manner.

In yet another aspect, this invention comprises a method for rolling a multi-contact gear comprising the steps of determining a driven gear layout of a driven gear comprising a plurality of driven teeth, using the driven gear layout to define a drive gear layout of a drive gear comprising a plurality of drive teeth, adjusting said drive gear layout to provide an adjusted drive gear layout wherein at least two of the plurality of drive teeth contact at least two of said plurality of driven teeth at different contact points, using the adjusted drive gear layout to roll a shaft to provide a rolled gear.

In still another aspect, this invention comprises a method for generating a gear comprising the steps of specifying a plurality of requirements for the drive gear, determining a trial gear tooth thickness, determining a trial gear shaft thickness, establishing a standard straight gear layout comprising a plurality of layout gear teeth using the plurality of requirements, the trial gear tooth thickness, and the trial gear shaft thickness, altering the straight gear layout to provide a modified gear layout having at least two of the plurality of layout gear teeth contacting a mating gear having a plurality of mating teeth in different face contact positions on the mating teeth.

In yet another aspect, this invention comprises a system for driving a window comprising a drive motor, a window, a coupler for coupling the window to the drive motor such that when the drive motor is energized, the window is driven to a desired position, the coupler comprising a gear train having a drive gear coupled to the drive motor and a driven gear; and linkage for coupling the drive gear to the window, the drive gear comprising a plurality of drive teeth in cross section, the plurality of drive teeth being substantially parallel to one another, the driven gear comprising a plurality of driven teeth in cross section; the plurality of drive teeth contacting the plurality of driven teeth at a plurality of contact points such that wear is distributed across a face of each of the plurality of drive teeth.

An object of this invention is to provide a drive gear, such as a worm gear, having improved torque capacity.

Another object of this invention is to provide a multi-tooth drive system and method.

Still another object is to provide a multi-tooth contact gear which can be mass produced using roll manufacturing techniques and which comprises features of a traditional enveloped gear.

Another object of this invention is to provide a method for designing a drive gear having improved torque capacity.

Still another object of this invention is to provide a system and method for driving a component, such as a window in an automobile, where the system and method utilize a multi-tooth contact drive gear which facilitates distributing wear on the driven gear.

DETAILED DESCRIPTION OF PREFERRED EMBODIMENT

Figure 1:
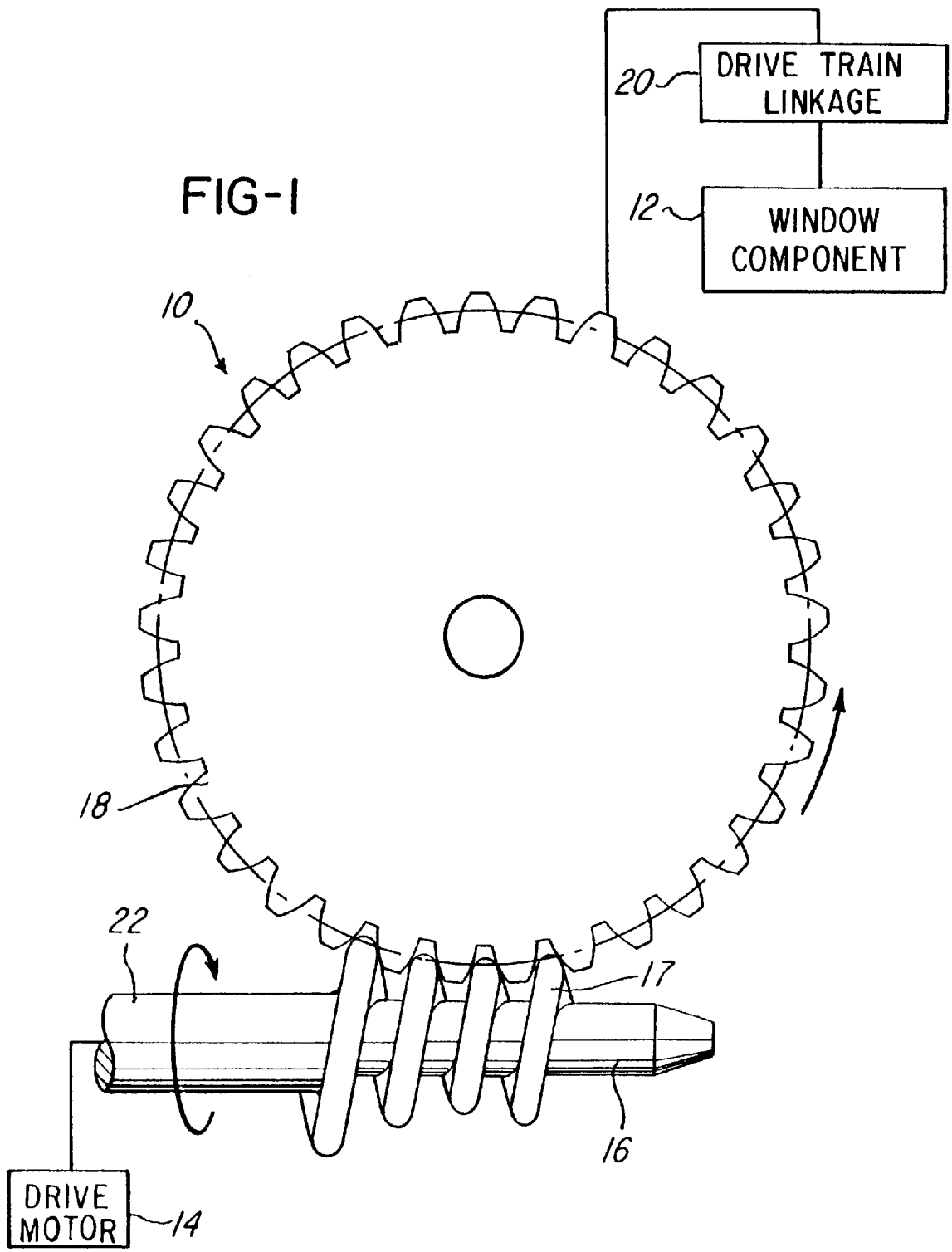
FIG. 1 is a fragmentary view showing a system in accordance with the present invention.
Figure 2:
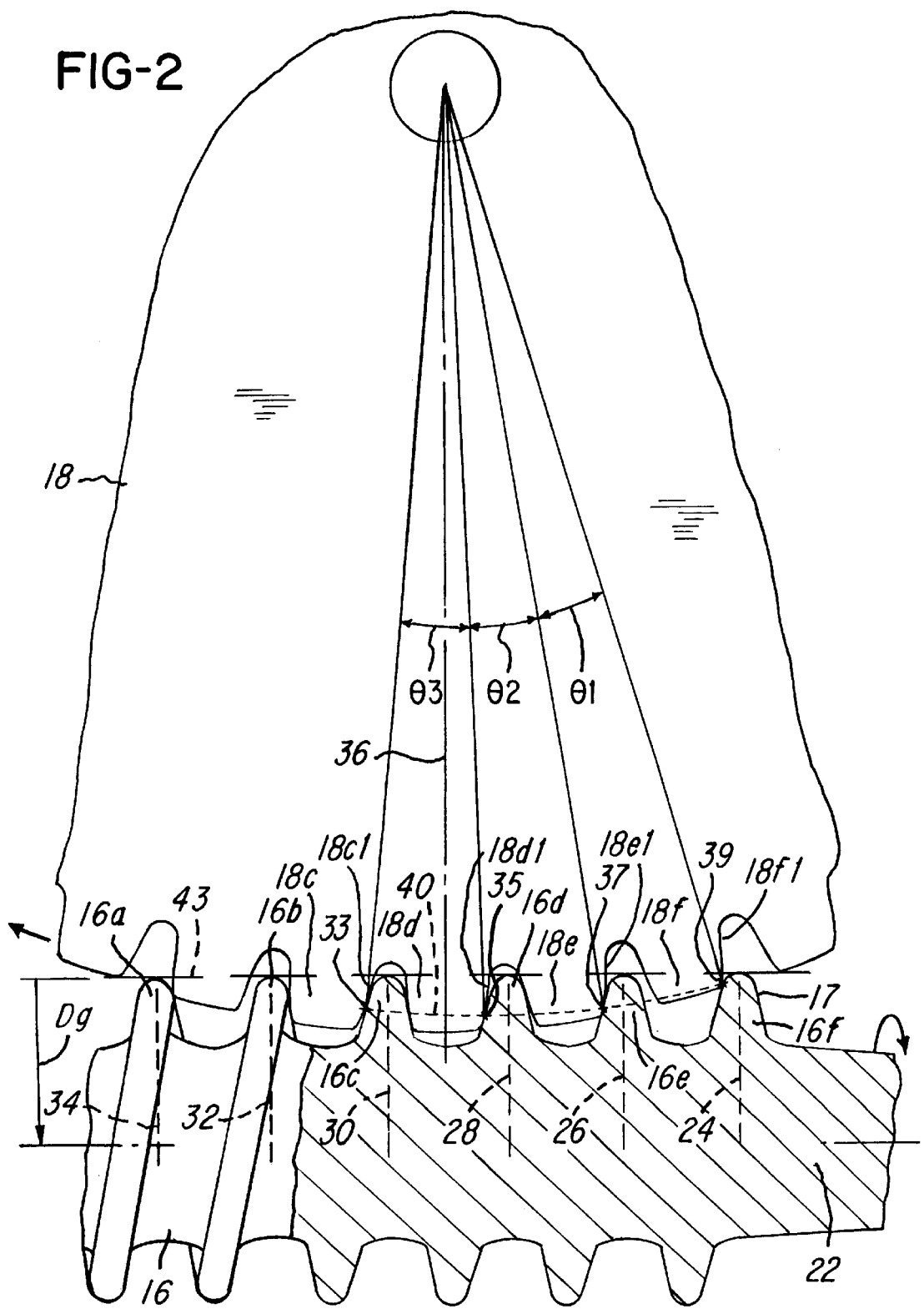
FIG. 2 is a fragmentary sectional view showing a relationship between a drive gear and driven gear and their respective teeth.

Referring now on FIG. 1, a system 10 is shown for driving a component 12, such as a window (not shown) in a door (not shown) of a vehicle (not shown). The system 10 comprises a drive motor 14 which is coupled to a drive gear 16. In the embodiment being described, the drive gear 16 is a worm gear having a single helical thread 17, and the drive motor 14 may be Part No. 16631020 available from the assignee of the present invention. As illustrated in FIG. 2, notice that thread 17 of gear 16 defines a plurality of teeth in cross section, such as teeth 16a–16f. It should be appreciated, however, that the gear 16 may actually comprise more than one single helical thread (i.e., multiple individual threads or several separate threads).

It should be appreciated that the drive motor 14 (FIG. 1) rotatably drives drive or worm gear 16 at approximately 3000 revolutions per minute in response to actuation of a switch (not shown), such as a power window switch in the vehicle.

As illustrated in FIG. 1, drive gear 16 is operably associated with and coupled to driven gear 18 which, in turn, is coupled to component 12 via suitable linkage 20. In the embodiment being described, the linkage 20 comprises a drive train of gears, lever arms and the like, as are conventionally known.

Notice that the plurality of drive teeth 16a–16f (FIG. 2) each comprise an associated imaginary center line, such as imaginary center lines 24, 26, 28, 30, 32 and 34. Note that the center lines 24–34 for teeth 16a–16f are substantially parallel to each other and substantially perpendicular to an axis of shaft 22.

As further illustrated in FIG. 2, notice that center lines 24–34 are also substantially parallel to a radial line 36 which emanates from gear 18 and which is perpendicular to the axis of shaft 22.

Advantageously, this design facilitates manufacturing drive gear 16 using conventional roll manufacturing techniques. This, in turn, facilitates producing drive gears 16 on a mass-production basis.

As illustrated in FIG. 2, notice that the plurality of teeth 16a–16f engage mating teeth, such as teeth 18c–18f, to rotatably drive gear 18 in response to driven rotation of shaft 22 by motor 14 (FIG. 1). Notice also that teeth 16a–16f engage mating teeth 18c–18f at a plurality of contact points 33, 35, 37 and 39. These contact points lie in an arbitrary arrangement 40 which is typically not concentric about the axis of gear 18. Also, note that a pitch distance between adjacent contact points, such as contact points 33–35 and 37–39 may vary, while angles $\theta_1$, $\theta_2$ and $\theta_3$ remain substantially equal, as described later herein. Also, these pitches or distances between points 33, 35, 37, and 39 may vary continuously depending on the tooth position of drive teeth 16a–16f.

It should also be appreciated that the point of contact of the various contact points 33, 35, 37 and 39 varies on each tooth face. As shown in FIG. 2, the contact point 33 on a face 18c1 of tooth 18c, contact point 35 on a face 18d1 of tooth 18d, contact point 37 on a face 18e1 of tooth 18e and contact point 39 on a face 18f1 of tooth 18f each lie at different points on their respective faces. This facilitates distributing wear across the faces of the plurality of teeth of driven gear 18.

Note that the teeth 16a–16f define a plurality of index angles $\theta_1$, $\theta_2$ and $\theta_3$ which are substantially equal or constant.

Advantageously, this invention facilitates increasing the torque capacity of gear 16 by providing three or more contact points, rather than a single or two tooth contact point for conventional worm gear. It has been found that a drive gear 16 which comprises features of this invention may achieve a torque capacity which is similar to that of an enveloped worm gear which required special machining and could not be mass produced using conventional roll manufacturing techniques.

Figure 3:
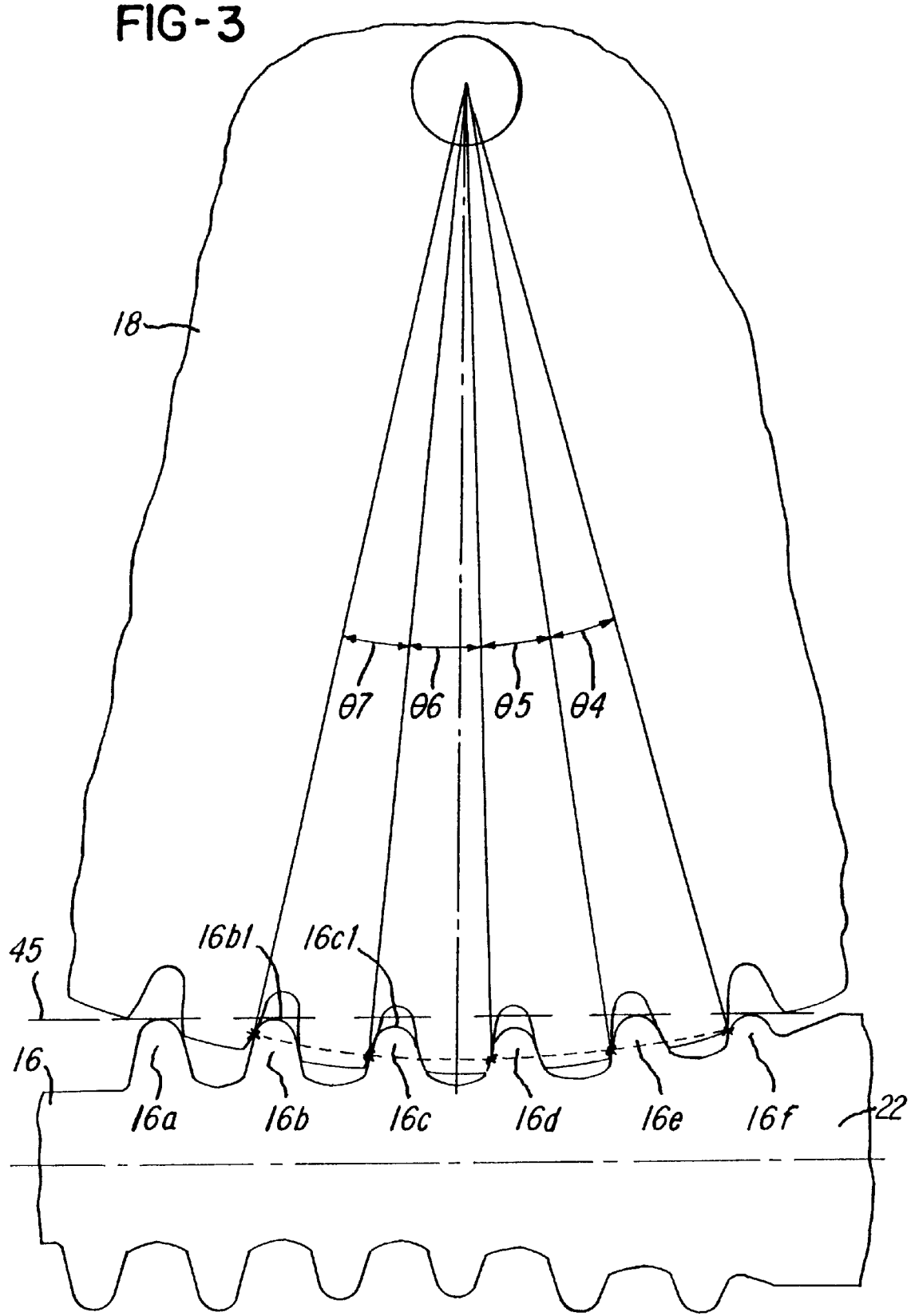
FIG. 3 is another view similar to that shown in FIG. 2 showing further details of the invention.

As illustrated in FIG. 2, notice that the drive gear 16 may be provided with teeth which define a profile which is generally cylindrical or straight relative to line 43. Alternatively, as illustrated in FIG. 3, the plurality of teeth 16a–16f could be manufactured such that the distance between tips, such as tip 16b1 on tooth 16b and tip 16c1 on tooth 16c, cooperate to define a profile which is stepped relative to axis of shaft 22. Still further, the plurality of teeth 16a–16f could be curved (not shown) to complement the shape of the driven gear 18, such that driven gear 18 becomes partially enveloped. It should be appreciated that altering the arrangement and profile of teeth 16a–16f can facilitate changing the contact points 33, 35, 37 and 39 mentioned earlier herein, as well as improve the torque capacity of gear 16 by providing a greater number of available driving teeth for driving teeth 18a–18f of gear 18.

Thus, in contrast with a conventional straight worm gear, the apparatus and method of the present invention tolerates variations in the distance between the tips, such as tips 16b1 and 16c1 of teeth 16b and 16c, respectively, and the axis of shaft 22. Thus, the gear 16 may be designed such that tooth heights vary. In addition, it should be appreciated that the features of this invention and of gear 16 may be utilized with a mating or driven gear 18 which is helical, spur or any suitable gear having involute teeth.

A method for generating a gear having the features mentioned above and as illustrated in FIGS. 1–3 will now be described. The method begins by specifying a plurality of requirements for the gear to be designed.

In particular, it is necessary to define a speed ratio, a center distance between a nominal center line of drive gear 16 and center line of worm gear 18. This is particularly advantageous when the mating gear 18 is molded from plastic material and the worm is made of metal or steel material, and a maximum output torque is to be achieved by the drive gear 16.

Next, other specifications, including the number of worm starts ("Nw"), number of gear teeth ("Ng"), first trial gear pitch diameter ("Dg") in FIG. 2), are defined. A gear module M is set equal to (Dg/Ng), and a gear circular pitch ("Pc") is defined as π×M.

A first trial gear tooth thickness ("Tg") and first trial worm tooth thickness ("Tw") may be calculated, where:

$$Pc' = Pc - \text{Backlash}$$

$$Tg = \frac{Pc'}{2} * (1 + x\%)$$

$$Tw = Pc' - Tg = \frac{Pc'}{2} * (1 - x\%)$$

$$\theta_1 = \theta_2 = \theta_3 = \theta_4 = \frac{360}{NG/NW}$$

where "x" is a material strength balance factor used, for example, when balancing the strength of the drive gear 16 relative to the driven gear 18. This is particularly important where the mating gear 18 is made of plastic material and the drive gear 16 is made of steel or metal.

After the plurality of requirements mentioned above are specified, the trial gear tooth thickness and trial worm tooth thickness are determined using conventional formuli for a standard straight gear or worm layout. For purposes of illustration, a straight worm layout is illustrated in FIG. 4.

After the standard straight worm layout is determined, it is then determined whether the profile of the gear to be manufactured is cylindrical, stepped or curved as described earlier herein. If a cylindrical profile is selected, then the standard straight layout is altered by theoretically moving non-contacting worm teeth, such as teeth 42 and 44 shown in FIG. 4 to the position shown by teeth 61 and 63 in FIG. 5. Notice in FIG. 5, for example, that the teeth 61 and 63 contact gear teeth 67 and 69, respectively, at contact points 50 and 52. Thus, it should be appreciated that the radial and axial tooth position, such as the position of teeth 61 and 63 relative to axis 55 is adjusted while adhering to the rule that $\theta_1=\theta_2=\theta_3$. At this point, the gear tooth thickness Tg and worm tooth thickness Tw mentioned earlier are adjusted while maintaining the angular relationship $\theta_1=\theta_2=\theta_3$.

Figure 4:
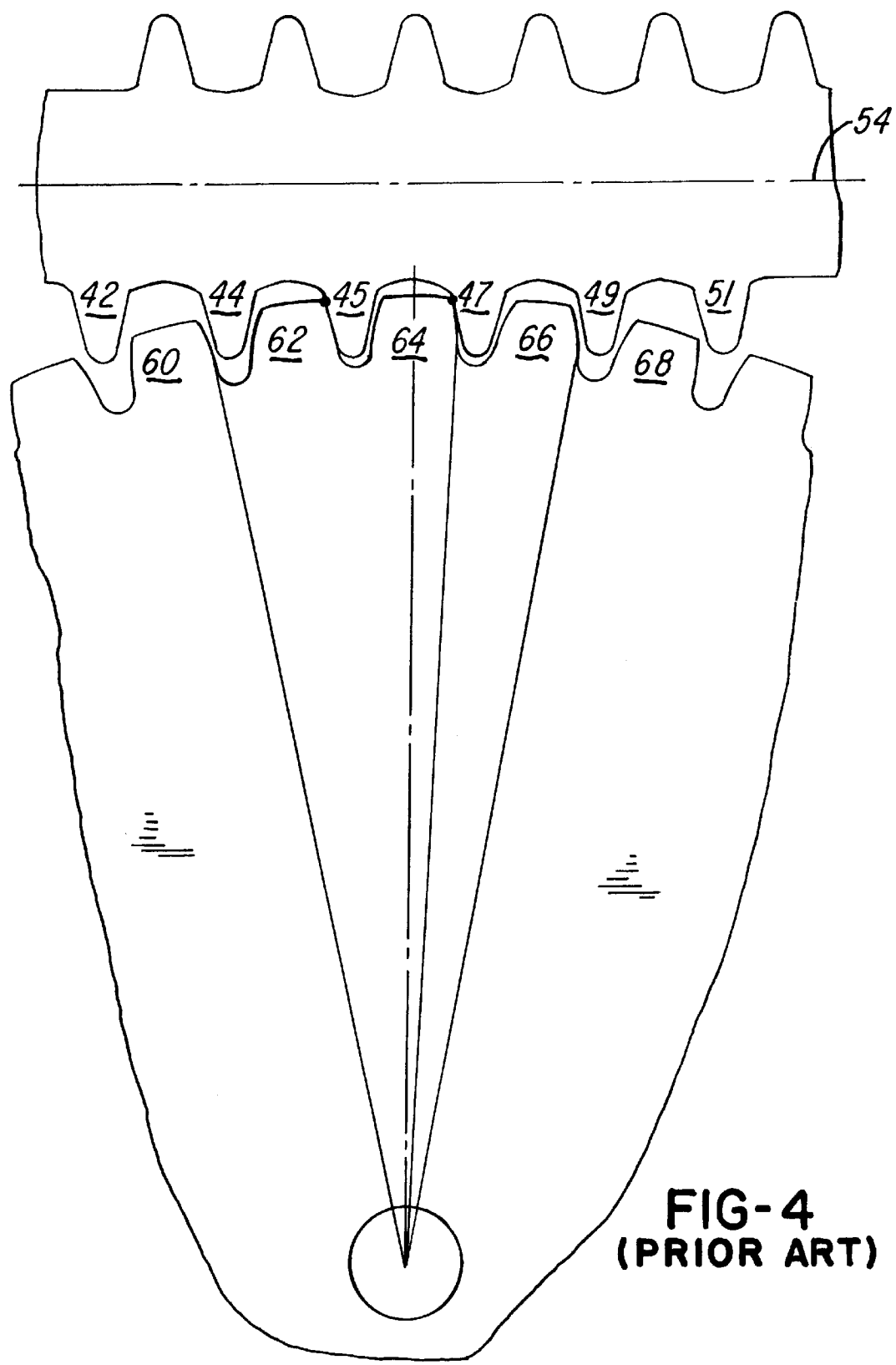
FIG. 4 is a view of a conventional straight worm gear.
Figure 5:
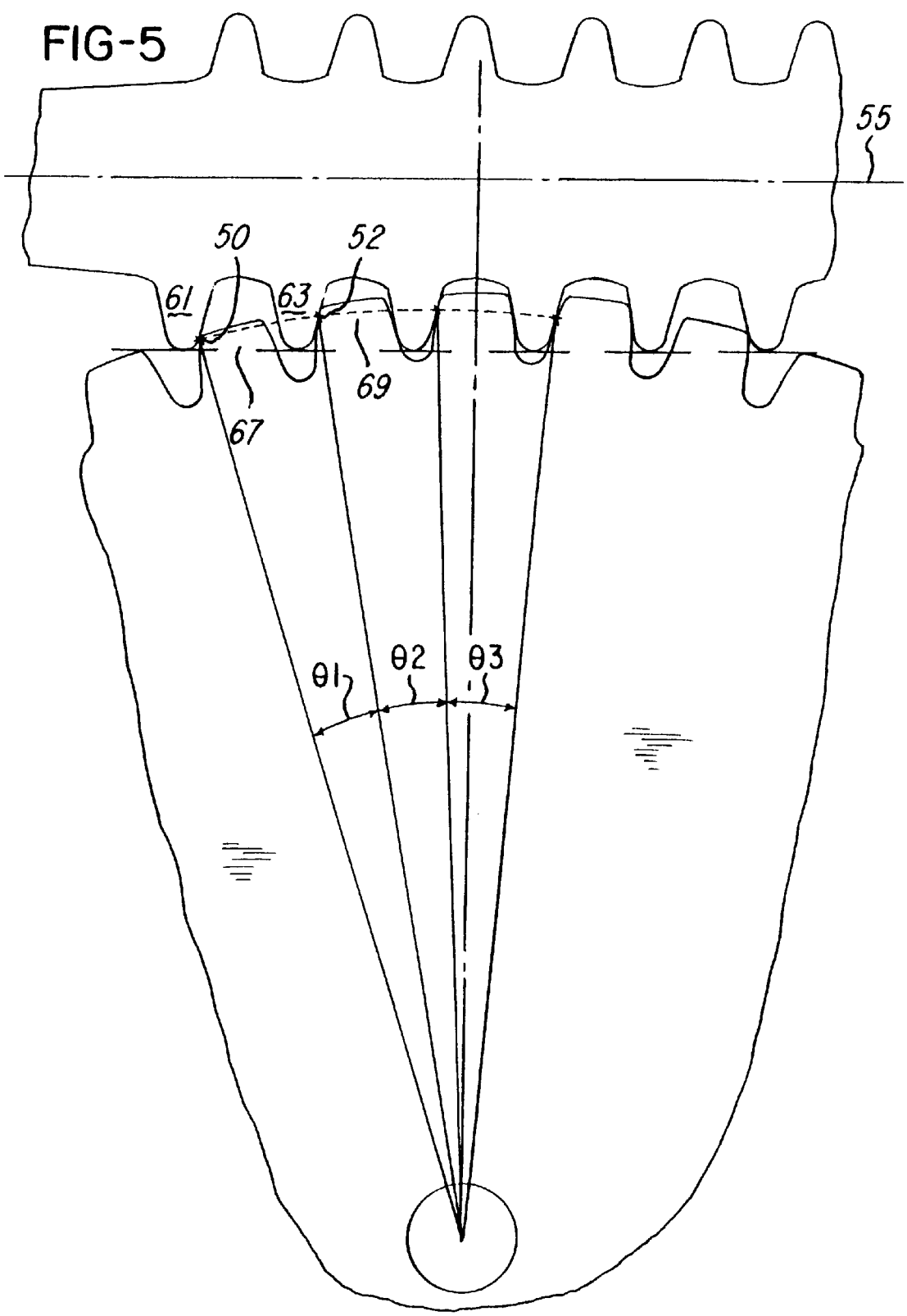
FIG. 5 is a view of a drive gear of the present invention which has been manufactured using features of the present invention.
Figure 6:
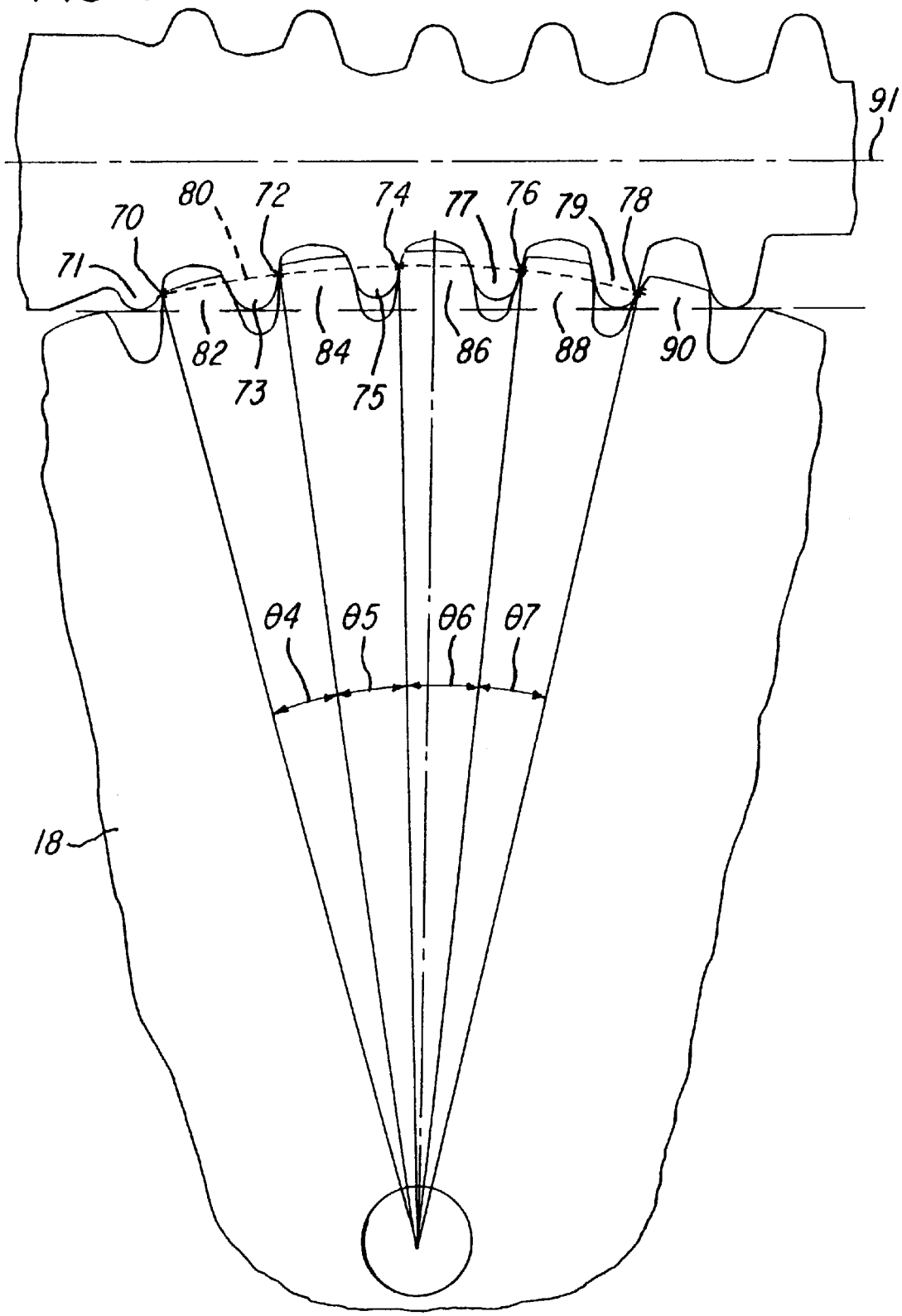
FIG. 6 is a fragmentary view showing details of a gear having features in accordance with the present invention.

If the profile of drive gear 16 is selected to be stepped as illustrated in FIG. 3, then the non-contacting teeth, such as teeth 42 and 44 respectively, are moved into contact with mating teeth 60–62, respectively, in FIG. 4. Thus, as viewed in FIG. 6, notice that a tooth 71 mates with tooth 82. The position of teeth 71, 73, 75, 77 and 79 are theoretically adjusted to mate with gear teeth 82, 84, 86, 88 and 90, respectively, as illustrated in FIG. 6. Notice that the plurality of contact points 70, 72, 74, 76 and 78 define an arc 80 which is arbitrary and may not be concentric about an axis 91 of gear 18. It should be appreciated that, as with the alteration regarding the cylindrical profile, this alteration regarding a stepped profile is performed while maintaining equal gear index angles (i.e., $\theta_4=\theta_5=\theta_6=\theta_7$ as shown in FIG. 6).

If it is desired that the profile of the gear 16 to be manufactured comprise a curved or arbitrary shape, then Tg, Tw and the radial and axial tooth position mentioned above are varied to achieve equal gear index angles such that angles $\theta_1=\theta_2=\theta_3$ (FIG. 2) or angles $\theta_4=\theta_5=\theta_6=\theta_7$ (FIG. 6).

The method for increasing the drive torque of a roll manufactured drive gear is achieved by this invention by generating a drive gear (not shown) in accordance with the aforementioned drive gear layout.

Advantageously, because the teeth are substantially parallel and the angular relationships substantially the same, a drive shaft may be manufactured using conventional roll manufacturing techniques. The drive gear 16 (FIG. 2) and its associated plurality of drive teeth 16b–16f may then be positioned in an operative relationship with a plurality of driven teeth on the driven gear 18 which may be a spur gear or a helical gear.

In the embodiment being described, the gear 16 is used in the system 10 in a vehicle environment where in response to a switch (not shown) the drive motor 14 (FIG. 1) is energized by a controller (not shown). The drive motor 14 rotatably drives drive gear 16 which, in turn, drives driven gear 18. In response thereto, drive gear 18 drives component 12 via suitable linkage 20. This causes the component 12, like a window in an automobile (not shown), to move in a desired direction, such as from an open position to a closed position or vice versa.

Advantageously, this system and method provide means for using roll manufacturing technology to generate a multi-tooth contact and variable contact gear, such as a worm gear.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A component drive motor comprising:

a motor for driving a worm gear, said worm gear comprising a plurality of worm teeth in cross section which are substantially parallel to one another and which each have an index angle which is substantially the same;

a driven gear comprising a plurality of driven teeth; said plurality of worm teeth each having a thickness which is substantially the same and contacting said plurality of driven teeth at a plurality of contact points such that wear is distributed across a face of each of said plurality of driven teeth;

said plurality of contact points defining a plurality of pitches which vary, while said index angle remains substantially equal;

wherein said plurality of contact points lie at different respective points on said plurality of drive teeth;

a linkage coupler for coupling said driven gear to a component such that when said motor is energized said component is driven in a predetermined manner; and wherein said driven gear is a helical gear.

2. A system for driving a window comprising:

a drive motor;

a window;

a coupler for coupling said window to said drive motor such that when said drive motor is energized, said window is driven to a desired position;

said coupler comprising:
- a gear train having a drive gear coupled to said drive motor and a driven gear;
- linkage for coupling said drive gear to said window;
- said drive gear comprising a plurality of drive teeth defining substantially equal index angles, said plurality of drive teeth being substantially parallel to one another and each tooth having a thickness which is substantially the same;
- said driven gear comprising a plurality of driven teeth in cross section; said plurality of drive teeth contacting said plurality of driven teeth at a plurality of contact points such that wear is distributed across a face of each of said plurality of drive teeth;
- said plurality of contact points defining a plurality of pitches which vary, while said index angle remains substantially equal; wherein said plurality of contact points lie at different respective points on said plurality of drive teeth; and
- wherein said driven gear is a helical gear.

* * * * *